(12) United States Patent
Wynter et al.

(10) Patent No.: US 11,176,812 B2
(45) Date of Patent: Nov. 16, 2021

(54) REAL-TIME SERVICE LEVEL MONITOR

(71) Applicant: INTERNATIONAL BUSINESS MACHINES CORPORATION, Armonk, NY (US)

(72) Inventors: Laura Wynter, Singapore (SG); Hasan Poonawala, Singapore (SG); Baoyang Song, Ivry-sur-Seine (FR)

(73) Assignee: International Business Machines Corporation, Amonk, NY (US)

( * ) Notice: Subject to any disclaimer, the term of this patent is extended or adjusted under 35 U.S.C. 154(b) by 668 days.

(21) Appl. No.: 15/935,295

(22) Filed: Mar. 26, 2018

(65) Prior Publication Data

US 2019/0295408 A1   Sep. 26, 2019

(51) Int. Cl.
  *G08G 1/01*  (2006.01)
  *G08G 1/00*  (2006.01)
  *H04B 1/3827* (2015.01)
(52) U.S. Cl.
  CPC .............. *G08G 1/012* (2013.01); *G08G 1/20* (2013.01); *H04B 1/3827* (2013.01)
(58) Field of Classification Search
  CPC .......... G08G 1/012; G08G 1/20; G08G 1/123; G01S 5/00
  (Continued)

(56) References Cited

U.S. PATENT DOCUMENTS

| | | | |
|---|---|---|---|
| 9,628,499 B1 * | 4/2017 | Yu .......................... | H04L 43/022 |
| 2008/0054072 A1 * | 3/2008 | Katragadda ............ | G08G 1/123 235/384 |

(Continued)

FOREIGN PATENT DOCUMENTS

| | | |
|---|---|---|
| CN | 203217776 U | 9/2013 |
| CN | 105083336 A | 11/2015 |

(Continued)

OTHER PUBLICATIONS

S. Atev, G. Miller and N. P. Papanikolopoulos, "Clustering of Vehicle Trajectories," in IEEE Transactions on Intelligent Transportation Systems, vol. 11, No. 3, pp. 647-657, Sep. 2010, doi: 10.1109/TITS.2010.2048101. (Year: 2010).*

(Continued)

*Primary Examiner* — Isaac G Smith
(74) *Attorney, Agent, or Firm* — L. Jeffrey Kelly

(57) ABSTRACT

A method for service level management of a transit system is provided. The method may include receiving time series data sets from wireless access points of a wireless network, wherein each time series data set corresponds to a mobile device in the transit system. Spatio-temporal trajectories of each mobile device may be determined based on the time series data sets corresponding to each mobile device. The determined trajectories of a group of individual devices may be clustered. A spatio-temporal trajectory of a vehicle in the transit system may be determined based on the clustered trajectory of the group of devices. A system parameter of the transit system may be adjusted based on the determined trajectory of the vehicle. Passenger transition rates, waiting times, unable-to-board levels, and crowd density levels may be determined with respect to a transit location. A machine learning model may be generated to augment the determinations.

15 Claims, 7 Drawing Sheets

(58) Field of Classification Search
USPC .................................................. 701/117, 482
See application file for complete search history.

(56) References Cited

U.S. PATENT DOCUMENTS

| | | | |
|---|---|---|---|
| 2008/0195257 | A1 | 8/2008 | Rauch |
| 2011/0301832 | A1* | 12/2011 | Zheng ................ G01C 21/3484 |
| | | | 701/425 |
| 2015/0073894 | A1* | 3/2015 | Leaute ............... G06Q 30/0248 |
| | | | 705/14.47 |
| 2016/0078576 | A1 | 3/2016 | Su et al. |
| 2016/0148267 | A1 | 5/2016 | Pittman et al. |
| 2019/0228358 | A1* | 7/2019 | Ootsuka ........... G06Q 10/06312 |

FOREIGN PATENT DOCUMENTS

| | | |
|---|---|---|
| CN | 105320997 A | 2/2016 |
| CN | 105431343 A | 3/2016 |
| CN | 110356437 A | 10/2019 |
| WO | 03069576 A1 | 8/2003 |

OTHER PUBLICATIONS

C. Yang, F. Yan and X. Xu, "Daily metro origin-destination pattern recognition using dimensionality reduction and clustering methods," 2017 IEEE 20th International Conference on Intelligent Transportation Systems (ITSC), Yokohama, 2017, pp. 548-553, doi: 10.1109/ITSC.2017.8317899. (Year: 2017).*

J. Li, F. Lin and B. M. Chen, "A statistical approach for trajectory analysis and motion segmentation for freely moving cameras," IECON 2015—41st Annual Conference of the IEEE Industrial Electronics Society, Yokohama, 2015, pp. 001592-001597, doi: 10.1109/IECON.2015.7392328. (Year: 2015).*

Z. Fu, Z. Tian, Y. Xu and K. Zhou, "Mining Frequent Route Patterns Based on Personal Trajectory Abstraction," in IEEE Access, vol. 5, pp. 11352-11363, 2017, doi: 10.1109/ACCESS.2017.2712703. (Year: 2017).*

Q. Estève, S. Lif, M. Cossic, F. Leurent, B. Kabalan and X. Xie, "Understanding the transfer function of mass transit hub by Automated Fare Collection data," 2017 5th IEEE International Conference on Models and Technologies for Intelligent Transportation Systems (MT-ITS), Naples, 2017, pp. 592-597. (Year: 2017).*

L. Matias, J. Gama, J. Mendes-Moreira and J. Freire de Sousa, "Validation of both number and coverage of bus schedules using AVL data," 13th International IEEE Conference on Intelligent Transportation Systems, Funchal, 2010, pp. 131-136, doi: 10.1109/ITSC.2010.5625235. (Year: 2010).*

H. Yoon and C. Shahabi, "Accurate Discovery of Valid Convoys from Moving Object Trajectories," 2009 IEEE International Conference on Data Mining Workshops, Miami, FL, 2009, pp. 636-643, doi: 10.1109/ICDMW.2009.71. (Year: 2009).*

Martin, "Predictive Reasoning and Machine Learning for the Enhancement of Reliability in Railway Systems", RSSRail 2016, LNCS 9709, pp. 178-188.

Kecman et al., "Predictive modelling of running and dwell times in railway traffic", Public Transp. Jun. 24, 2015, vol. 7, pp. 295-319.

Kecman et al., "Online Data-Driven Adaptive Prediction of Train Event Times", IEEE Transactions on Intelligent Transportation Systems, vol. 16, No. 1, Feb. 2015, pp. 465-474.

Kecman et al., "An online railway traffic prediction model", ResearchGate, Conference Paper, May 2013, pp. 1-19.

Kecman et al., "Process mining of train describer event data and automatic conflict identification", WIT Transactions on The Built Environment, vol. 127, 2012, Computers in Railways XIII, pp. 227-238.

Wang et al., "Feasibility Study of Mobile Phone WiFi Detection in Aerial Search and Rescue Operations", APSys '13, Jul. 29-30, 2013, 6 pages.

Ester et al., "A Desnsity-Based Algorithm for Discovering Clusters in Large Spatial Databases with Noise", KDD-96 Proceedings, pp. 226-231.

Luxburg et al., "A Tutorial on Spectral Clustering", Statistics and Computing, vol. 17, No. 4, 2007, pp. 1-32.

Musa et al., "Tracking Unmodified Smartphones Using Wi-Fi Monitors", SenSys'12, Nov. 6-9, 2012, 14 pages.

Barbera et al., "Signals from the Crowd: Uncovering Social Relationships through Smartphone Probes", IMC'13, Oct. 23-25, 2013, pp. 265-276.

Handte et al., "Crowd Density Estimation for Public Transport Vehicles", Workshop Proceedings of the EDBT/ICDT 2014 Joint Conference, Mar. 28, 2014, pp. 315-322.

Rousseeuw et al., "Alternatives to the Median Absolute Deviation", Journal of the American Statistical Association, Dec. 1993, vol. 88, No. 424, Theory and Methods, pp. 1273-1283.

Cunche, Smartphone, Wi-Fi et vie privée: comment votre smartphone peut se révéler être votre pire ennemi, 1, 2013, HAL Id: hal-00874078, Submitted on Feb. 14, 2014, pp. 1-21.

Mell et al., "The NIST Definition of Cloud Computing", Recommendations of the National Institute of Standards and Technology, Special Publication 800-145, Sep. 2011, 7 pages.

Alaggan et al., "Privacy-Preserving t-Incidence for WiFi-based Mobility Analytics", 7e Atelier sur la Protection de la Vie Privée (APVP'16), Jul. 2016, 17 pages, https://apvp2016.sciencesconf.org/, HAL Id: hal-01376798.

Fuxjaeger et al., "Highway Traffic Flow Measurement by Passive Monitoring of Wi-Fi Signals", 2014 International Conference on Connected Vehicles and Expo (ICCVE), pp. 396-401.

Le et al., "Real-time Prediction of Length of Stay Using Passive Wi-Fi Sensing", IEEE ICC 2017 SAC Symposium Internet of Things Track, 6 pages.

Chetty et al., Abstract for "Passive WiFi Radar: A New Technology for Urban Area Surveillance", Crime Prevention in the 21st Century, Aug. 28, 2016, pp. 345-358.

Baeta et al., "Tracking Users Mobility at Public Transportation", PAAMS 2016 Workshops, CCIS 616, pp. 224-235, 2016.

CN Office Action, Application No. 201910218255.8, dated Feb. 25, 2021, 32 pages.

CN Office Action, dated Sep. 22, 2021, Application No. 201910218255.8, 24 pages.

* cited by examiner

REAL-TIME SERVICE LEVEL MONITOR

BACKGROUND

The present invention relates generally to transportation management, and in particular to service level monitoring and management of public transit systems.

A mobile device or station may connect to a computer network by way of a wireless access point. Access points may be distributed throughout environments such as metro or subway stations of a mass transit system to provide services such as Internet access, and the like. Individual devices may discover and connect to the network by periodically transmitting probe requests or communication signals that may be received by suitable access points such as those within range of the devices. The devices may continue to transmit probe requests during association with a particular access point, and probe requests may be received by access points within range of the devices regardless of whether any associations are established.

SUMMARY

According to an aspect of the present invention, a method for service level monitoring and management of a mass transit system is provided. The method may include receiving time series data sets from wireless access points of a wireless computer network, wherein each time series data set corresponds to a mobile device in the transit system. Spatio-temporal trajectories of each mobile device in the transit system may be determined based on the time series data sets corresponding to each mobile device. Each data set may include an identifier associated with a device, a timestamp indicating a time at which data corresponding to the device was received, and a location at which the data was received. The determined spatio-temporal trajectories of a group of individual devices may be clustered. A spatio-temporal trajectory of a vehicle in the transit system may be determined based on the clustered spatio-temporal trajectory of the group of individual devices. A system parameter of the transit system may be adjusted based on the determined spatio-temporal trajectory of the vehicle.

According to an aspect of the present invention, the method may include determining passenger transition rates with respect to a station platform of the transit system. The method may include determining passenger waiting times at the platform. The method may include determining unable-to-board levels at the platform. The method may include determining crowd density levels. The method may include generating a machine learning model to support and augment the aforementioned determinations.

According to various aspects of the present invention, the system parameter may be adjusted to reduce a crowd density level at a station platform in the transit system. System parameters may include vehicle schedules, passenger transition rates, station dwell times, vehicle headways, passenger waiting times, unable-to-board levels, and crowd density levels in vehicles and on station platforms or waiting areas of the transit system.

According to an aspect of the present invention, a computer system is provided for service level monitoring and management of a mass transit system by performing the disclosed method.

According to an aspect of the present invention, a computer program product is provided for service level monitoring and management of a mass transit system by performing the disclosed method.

BRIEF DESCRIPTION OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1A:
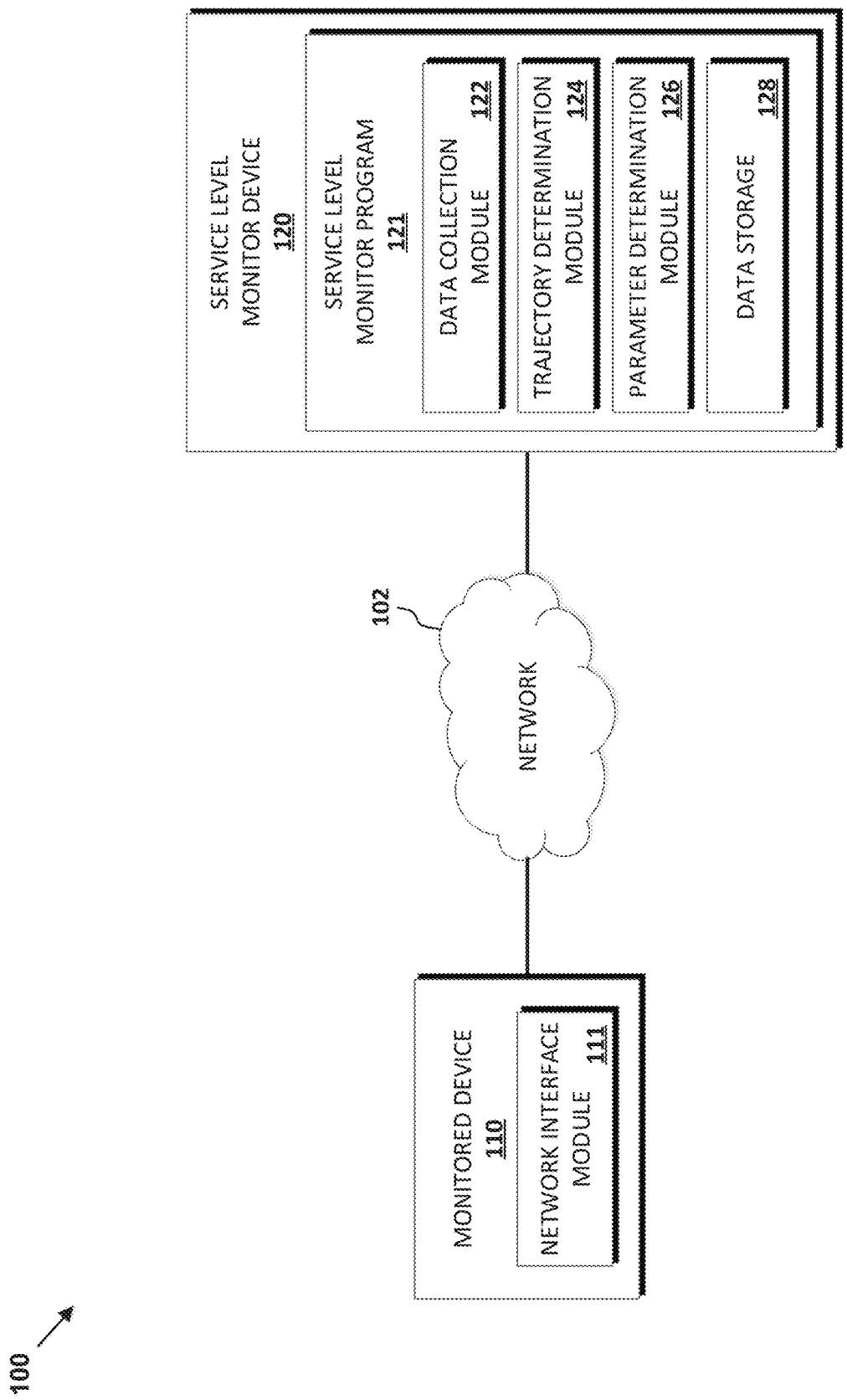
FIG. 1A is a functional block diagram depicting a service level monitor system, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, practical applications, or technical improvements over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment," "an embodiment," "an example embodiment," or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

System parameters and performance indicators of a public transportation system, such as a metro system, may be used to monitor and support system operation. The parameters and indicators may be determined based on track occupation data describing train locations and movements in the system. Potential service delays and disruptions that may be caused by individual train positions and movements, station dwell times, and potential route conflicts may be forecasted based on determinations of the parameters and indicators at a given point in time. Action may be taken on the basis of the forecasts to adjust and adapt the parameters to support system operation and to ensure adherence to travel schedules or timetables by trains in transporting varying amounts of people throughout the system. An effectiveness of the action taken to support system operation may depend on an accuracy of the forecasts, which may depend on an accuracy of the data. Further, real-time track occupation data may be important in effectively supporting the system by enabling real-time determination of the parameters and indicators as such may develop. For example, as incidents and levels of congestion may at times develop rapidly and seemingly randomly throughout the system, determination of corresponding indicators in real-time may in some cases provide the time needed to adjust certain operational parameters, make accommodations in the system to ensure operational reliability, or to otherwise take action to effectively support system operation.

While actual track occupation data such as may be received from train signaling systems may be reliable with respect to current train movements, such may include high levels of noise, and real-time access to the actual track occupation data may be limited, for example, to maintain system security. As such, track occupation data may commonly be simulated in conventional data analytics methods that aim to enhance the accuracy of the forecasts such as by way of various statistical methods, and the like. However, the noise in the actual track occupation data and assumptions made to simulate track occupation data may introduce potential sources of error and inaccuracy in the forecasts, preventing effective forecast determination and limiting the effectiveness of system support actions taken on such bases. Further, the actual and simulated track occupation data may fail to consider certain salient operational parameters such as crowd density levels in trains and on station platforms, or transit locations, which may affect system throughput by inhibiting passenger boarding.

Embodiments of the present invention are directed to a method, system, and computer program product for service level monitoring and management of a mass transit system. In an aspect, vehicle movements and system parameters of the transit system may be determined based on wireless computer networking data. The system parameters may include vehicle schedules, passenger transition rates, station dwell times, vehicle headways, passenger waiting times, unable-to-board levels, and crowd density levels in vehicles and on station platforms or waiting areas of the transit system.

In an aspect, the method may include receiving the data from individual mobile devices or mobile stations carried on or by persons including travelers in the transit system. The method may include determining spatio-temporal trajectories of the devices in the transit system based on a time series data set including sequences of records of the received data. Each sequence of the received data may correspond to a device in the transit system. The method may include reducing and clustering the trajectories of the devices to determine the vehicle movements and system parameters of the transit system. The method may include applying a data cleaning technique to the clustered trajectories. The wireless computer networking data may include wireless local area network data having 802.11 implementation specifications, otherwise known as Wi-Fi. The vehicle movements may include train movements.

In an aspect, the method may include determining passenger transition rates with respect to a station platform of the transit system. The method may include determining passenger waiting times at the platform. The method may include determining unable-to-board levels at the platform. The method may include determining crowd density levels. The method may include generating a machine learning model to support and augment the aforementioned determinations.

Advantageously, the present invention may be applied in transit systems such as metropolitan mass transit systems to quickly and accurately determine the vehicle movements and system parameters during both low and high flow travel conditions, based solely on the wireless computer networking data. As such, data relating to a number of vehicles in the system is not required. Further, the present invention may efficiently utilize the wireless computer networking data by effectively removing noise inherent to such data, providing a widely applicable and lightweight solution for use in a variety of environments, such as shopping malls, airports, and theme parks.

FIG. 1A is a functional block diagram depicting service level monitor system 100, in accordance with an embodiment of the present invention. Service level monitor system 100 may include monitored device 110 and service level monitor device 120, interconnected by way of network 102. While FIG. 1A depicts two discrete devices, other arrangements may be contemplated. For example, monitored device 110 or service level monitor device 120 may include one or more integrated or distinct devices. Numerous devices such as monitored device 110 may be included in service level monitor system 100, in accordance with embodiments of the present invention.

In various embodiments of the present invention, network 102 represents, for example, an intranet, a local area network (LAN), a personal area network (PAN), a wireless local area network (WLAN), a wireless personal area network (WPAN), a wireless mesh network, a wide area network (WAN) such as the Internet, or the like. In the various embodiments, network 102 may include wired, wireless, or fiber optic connections. In general, network 102 may include any combination of connections and protocols for supporting communications between monitored device 110 and service level monitor device 120, in accordance with embodiments of the present invention. In the various embodiments, network 102 may include, for example, a collection of networks, gateways, and wireless access points for supporting the communications.

In various embodiments of the present invention, monitored device 110 or service level monitor device 120 may represent individual or integrated computing platforms, such as a wearable device, an implantable device, a smart phone, a mobile phone, a tablet computer, a laptop computer, a desktop computer, a computer server, or the like. In the various embodiments, monitored device 110 or service level monitor device 120 may otherwise represent any other type of computing platform, computing system, or information system capable of sending and receiving data to and from another device by way of network 102. Monitored device 110 or service level monitor device 120 may include internal and external hardware components, as described with reference to FIG. 3. In other embodiments, Monitored device 110 or service level monitor device 120 may be implemented in a cloud computing environment, as described with reference to FIGS. 4 and 5.

In an embodiment of the present invention, monitored device 110 may include, for example, a computing platform such as a mobile device, or the like. In the embodiment, monitored device 110 may include a network interface such as network interface module 111. Network interface module 111 may be implemented in enabling communications between monitored device 110 and network 102, for example, by way of the wireless access points. In the embodiment, monitored device 110 may be carried on or by a person such as a traveler in a transit system. Monitored device 110 may implement a combination of devices and technologies, such as network devices and corresponding device drivers, to support the operation of network interface module 111, and to provide a platform enabling communications between monitored device 110 and service level monitor device 120, in accordance with embodiments of the present invention.

Network interface module 111 may be a device such as a network interface, a program such as a software program, one or more subroutines contained in a program, an application programming interface, or the like. Network interface module 111 may be implemented in the discovery of a network such as network 102, for example, by application in periodic broadcasting or transmission of probe requests. The probe requests may be received, for example, by suitable access points of network 102, including those within range of monitored device 110 at a given point in time, in accordance with embodiments of the present invention.

In an embodiment of the present invention, service level monitor device 120 may include, for example, a computing platform such as a server that may host an application such as service level monitor program 121. Service level monitor device 120 may implement a combination of devices and technologies, such as network devices and corresponding device drivers, to support the operation of service level monitor program 121, and to provide a platform enabling communications between devices such as monitored device 110 and service level monitor device 120, in accordance with embodiments of the present invention.

Service level monitor program 121 may be a program such as a software program, one or more subroutines contained in a program, an application programming interface, or the like. Service level monitor program 121 may include data collection module 122, trajectory determination module 124, parameter determination module 126, and data storage 128. Service level monitor program 121 may host data including data received from devices such as monitored device 110, in accordance with embodiments of the present invention. The data may be received by individual access points 104 of network 102, as depicted and described with reference to FIG. 1B.

Data collection module 122 communicates with the access points of network 102 to obtain or collect data received by the access points from each monitored device 110 in the transit system. Data collection module 122 may store the retrieved data in data storage 128, such as in the form of separate computer-readable data files for later retrieval and use.

In an embodiment of the present invention, the obtained data may include, for example, sequences of records corresponding to each monitored device 110. In the embodiment, each record in a sequence of records of a device, such as monitored device 110, may correspond to a probe request transmitted by the device. In the embodiment, the sequence of records may include, for example, fields including an anonymous identifier of the device (e.g., MAC address) as well as a timestamp and location (or in some cases a signal strength value). The update frequency of the data may be, for example, every time a probe request is sent by a mobile device 110, such as when a WiFi sniffer is used. The update frequency of the data may otherwise be, for example, based on pre-aggregation frequencies, such as of particular access points, which may be to the level of each second, every 5 seconds, every 10 seconds, and so on. In general, devices such as monitored device 110 may transmit probe requests at highly variable frequencies based on the unique characteristics of each individual device.

Trajectory determination module 124 determines spatio-temporal paths or trajectories of each monitored device 110 in the transit system. In an embodiment of the present invention, the trajectories may be determined based on the probe request data received from each monitored device 110. In the embodiment, the trajectories of the devices may be reduced and clustered to determine movements of each vehicle. The vehicle movements may correspond to clustered trajectories of the devices. In the embodiment, data cleaning techniques may be applied to the reduced and clustered trajectories in order to determine and distinguish between each of the vehicle movements. In the present disclosure, a trajectory may at times be referred to as a journey.

Parameter determination module 126 determines system parameters of the transit system based on the determined vehicle movements of each of the vehicles in the transit system. In an embodiment of the present invention, the system parameters may include vehicle or transit schedules, passenger transition rates, station dwell times, vehicle headways, passenger waiting times, unable-to-board levels, and crowd density levels in vehicles and on station platforms or waiting areas of the transit system. The vehicle schedules may include, for example, planned or anticipated arrival and departure schedules of individual vehicles with respect to station platforms of the transit system.

Figure 1B:
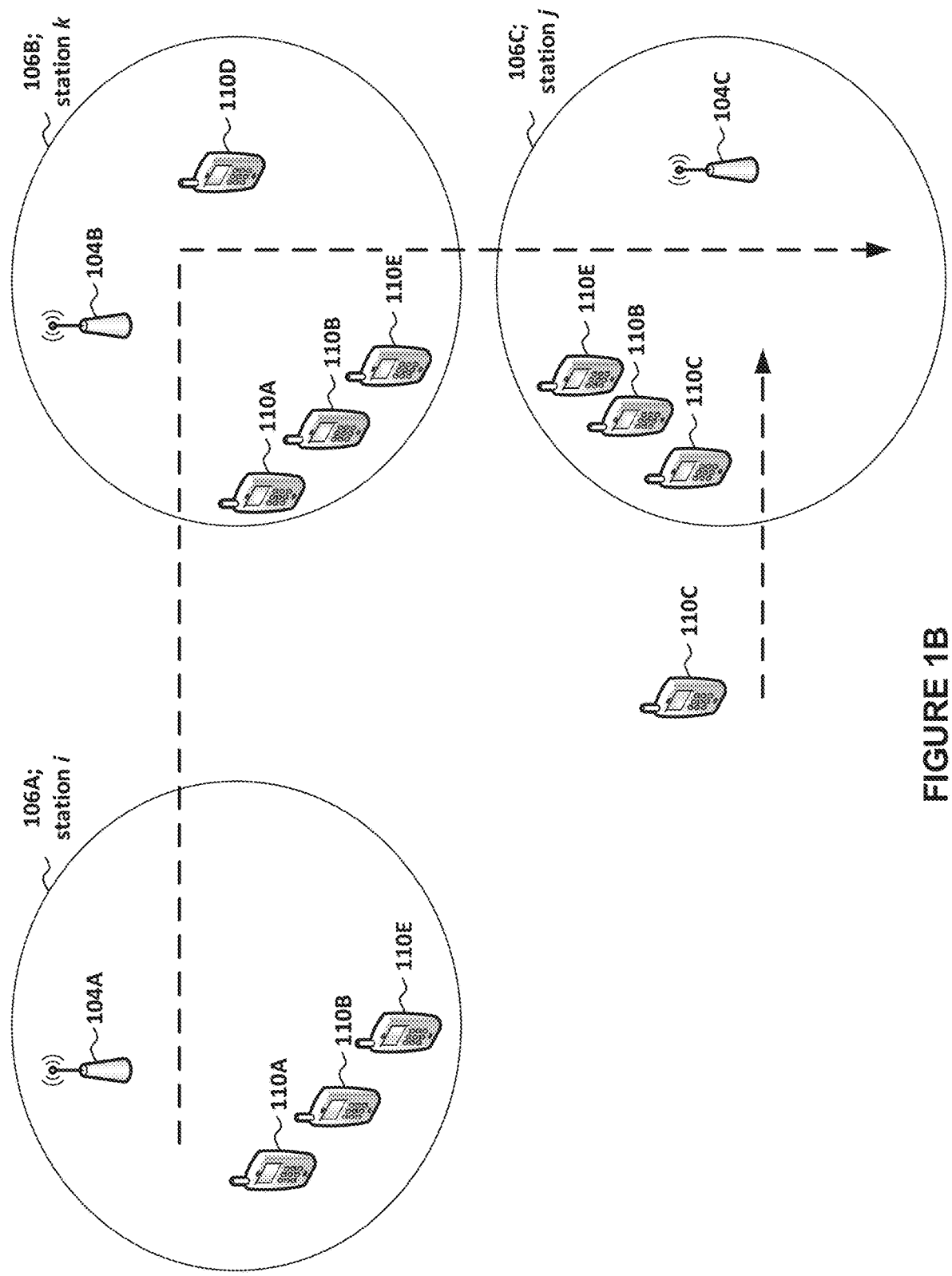
FIG. 1B is a block diagram depicting a transit system in which the service level monitor system may be implemented, in accordance with an embodiment of the present invention.

FIG. 1B is a block diagram depicting a transit system in which service level monitor system 100 may be implemented, in accordance with an embodiment of the present invention. The transit system may include monitored devices 110A, 110B, 110C, 110D, and 110E and stations 106A, 106B, and 106C. Stations 106A, 106B, and 106C may include individual access points 104A, 104B, and 104C, respectively. Generally, the transit system may include any number of monitored devices and stations such as 110A-E and 106A-C.

In an embodiment of the present invention, access points 104A, 104B, and 104C may receive probe requests such as may be transmitted by monitored devices 110A, 110B, and 110C. In the embodiment, the probe requests may be received when each monitored device 110 is within proximity of an access point such as one of access points 104A, 104B, and 104C. For example, probe requests transmitted by monitored devices 110A and 110B may be received by access point 104A when each monitored device 110A and 110B is located at station 106A. The probe requests transmitted by monitored devices 110A and 110B may no longer be received by access point 104A when each monitored device 110A and 110B transitions to station 106B, at which point the probe requests may then be received by access point 104B.

Figure 2A:
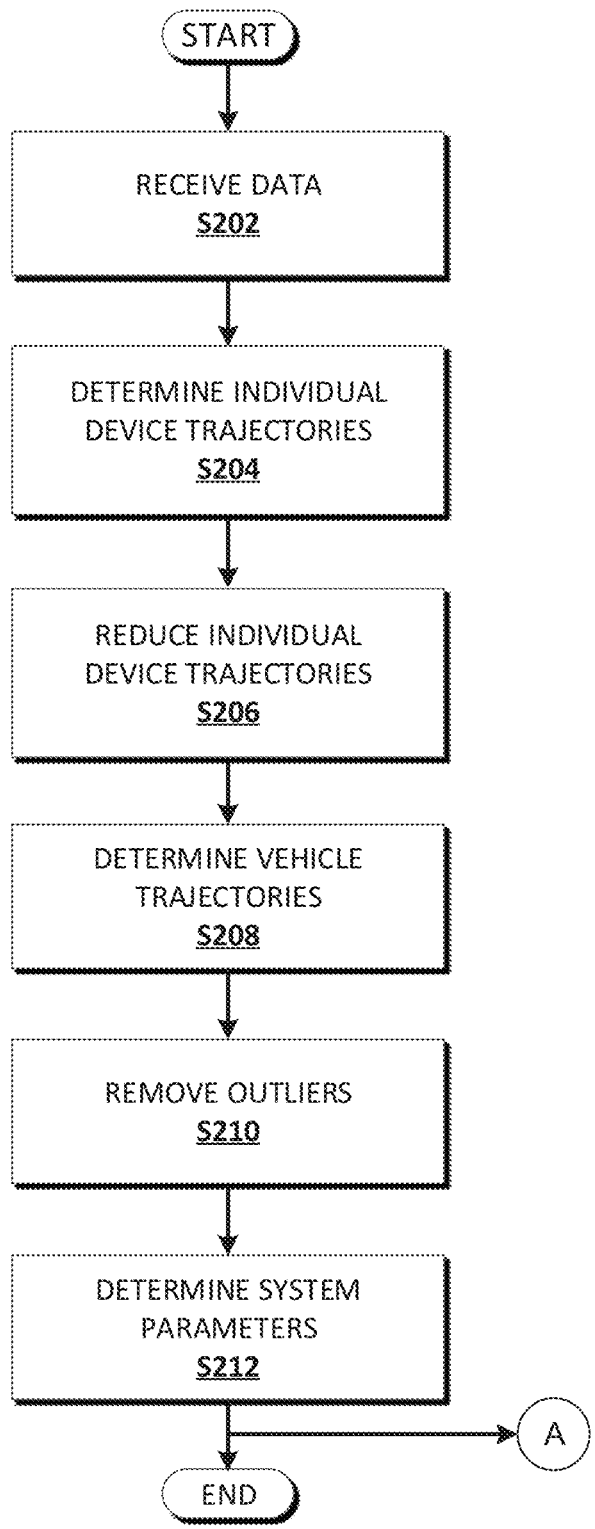
FIGS. 2A and 2B are flowcharts depicting operational steps of an aspect of the service level monitor system, in accordance with an embodiment of the present invention.

FIG. 2A is a flowchart depicting operational steps of an aspect of service level monitor system 100, in accordance with an embodiment of the present invention.

At step S202, data collection module 122 communicates with the access points of network 102 to obtain the probe request data, as received from each monitored device 110 by the access points in the transit system. The access points may include access points 104 as depicted in FIG. 1B. In some cases, probe requests from one device may be recorded every second, and from other devices at various other frequencies, depending on the characteristics of each device. In the embodiment, the probe requests received by the access points may include a MAC address respectively corresponding to each monitored device 110, timestamps corresponding to times at which the probe requests were received from each monitored device 110, and location or signal strength values corresponding to the access points by which the periodically transmitted probe requests were received from each monitored device 110.

At step S204, trajectory determination module 124 determines individual spatio-temporal trajectories of each monitored device 110 in the transit system. In an embodiment of the present invention, the spatio-temporal trajectory of each monitored device 110 may be determined based on the probe request data obtained from each respective device. In the embodiment, the probe request data may be aggregated into time-series data sets representative of sequences of records corresponding to each respective device. In implementing the obtained data with respect to a particular device such as monitored device 110, it is assumed that lack of an observation of the device for a period of time does not imply that the device is no longer present. Rather, the aggregation method employed must be robust to the highly-variable frequency of observations across the devices. To this end, the notion of a physical journey and a τ-journey is introduced:

Definition 1 (physical journey). Given a MAC address, m, and $R_m := \{(v_i, t_i)\}_{i=1}^n$ n records associated with m. A subset $R_m' \subset R_m$ is called a physical journey, if:
1. $R_m'$ belongs to a single train; and
2. if $R_m'' \subset R_m$ satisfies 1 and $R_m' \subset R_m''$, then $R_m' = R_m''$.

Definition 1

Generally, no information about the physical journey is available. Therefore, the τ-journey is introduced, to approximate the physical journey:
Definition 2 (τ-journey). Given a MAC address, m, and $R_m := \{(v_i, t_i)\}_{i=1}^n$ n records associated with m such that $t_1 \leq t_2 \leq \ldots \leq t_n$. A subset $R_m' \subset R_m$ is called a τ-journey if
1. (temporal continuity) $r_i, r_j \in R_m'$, such that i<j, we have $r_k \in R_m'$ for all $r_k \in R_m$, such that i<k<j;
2. (intra-station continuity) $\max_{r_i, r_j \in R_m'}, v_i = v_j |t_i - t_j| \leq \tau_1$;
3. (inter-station continuity) $\max_{r_i, r_j \in R_m'}, v_i \neq v_j |t_i - t_j| \leq \tau_1$;
4. (monotonicity) $\text{sgn}((t_i - t_j)(v_i - v_j))$ is constant for all $r_i, r_j \in R_m'$;
5. (maximality) if $R_m'' \subset R_m$ satisfying 1, 2, 3, and 4, and $R_m' \subset R_m''$, then $R_m' = R_m''$.

Definition 2 where τ-journey represents the journey, from station i to station j, of each monitored device 110, k, in the transit system; the MAC address, m, is the MAC address of each respective device; and Rm is the sequence of records corresponding to the probe requests received from each respective device. Station i may represent, for example, an origin station such as station 106A with respect to monitored devices 110A and 110B, and station j may represent, for example, a destination station such as station 106C with respect to monitored device 110B, as depicted in FIG. 1B. Station k, as depicted in FIG. 1B, may represent an intermediate station between stations i and j. In the embodiment, τ1 may be the average time period between two received probe requests of the same monitored device 110. To increase robustness of the models, it may be preferred to merge several actual journeys of a device such as 110 as a single journey, rather than decomposing the single journey as several journeys. The average time period may be chosen to be, for example, 8 minutes. The value of τ2 may depend, for example, on individual vehicle movements in the transit system. Since individual vehicles may experience delays, we choose a larger value such as 30 minutes. In general, τ2 may be selected such that it is unlikely that two records of a journey are more than τ2 minutes apart.

In an embodiment of the present invention, the spatio-temporal trajectory of a particular device such as monitored device 110 in the transit system may be determined, for example, with respect to an origin station and a destination station of the transit system. The trajectory may extend between the origin station and the destination station across any number of intermediate stations of the transit system. For example, the trajectory of monitored device 110B in the transit system may extend from origin station 106A (i.e., station i) to destination station 106C (i.e., station j), across an intermediate station such as station 106B, as depicted in FIG. 1B. The origin station and the destination station may otherwise include adjacently positioned stations, or stations positioned about one or more intermediate stations of the transit system. For example, the trajectory of monitored device 110A in the transit system may extend from origin station 106A to destination station 106B, as depicted in FIG. 1B. Each monitored device 110 may be recorded by access points during a respective journey of each device in the transit system. The access points may be respectively positioned at or about stations of the transit system.

In an embodiment of the present invention, a journey or trajectory of a device such as monitored device 110 through the transit system may be determined based on the first and last probe requests received from the device, with respect to each station by which the device may pass during the journey. The probe requests may be received by access points respectively positioned at each station by which the device passes. In the embodiment, records in a sequence of records for the device which correspond to intermediate stations positioned between an origin and destination station of the device may be removed from the sequence of records for the device Eliminating the intermediate records aids in reduction of a size of the computer networking data (e.g., WiFi data) by several orders of magnitude. As an example, for the trajectory of monitored device 110B in the transit system, extending from origin station 106A to destination station 106C across the intermediate station, station 106B, as depicted in FIG. 1B, records in the sequence of records for monitored device 110B corresponding to the intermediate station, station 106B, may be removed, accordingly.

At step S206, trajectory determination module 124 reduces or clusters the individual spatio-temporal trajectories of each monitored device 110 in the transit system.

In an embodiment of the present invention, a first data cleaning technique may be applied to the spatio-temporal trajectories of each monitored device 110, as determined at step S204. In the embodiment, the first data cleaning technique may include determining the trajectories of each monitored device 110 based on the last record of each device at an origin station of each respective device and the first record of each device at a destination station of each respective device. In the embodiment, the first data cleaning technique may further include determining the trajectories of each monitored device 110 based on the first and last records of each device at any intermediate stations through which each device respectively passes. In the embodiment, a second data cleaning technique may be applied to the spatio-temporal trajectories of each monitored device 110, as determined at step S204. In the embodiment, the second data cleaning technique may include removing the origin and destination stations from the sequences of records for each device. The origin station on the line may be added back once a train cluster is identified.

In an embodiment of the present invention, the second data cleaning technique may be applied to facilitate identification of individual vehicles in the transit system, and to associate corresponding vehicle journeys to each of the vehicles, respectively. In the embodiment, the first data cleaning technique may be applied to determine the system parameters of the transit system.

At step S208, trajectory determination module 124 determines spatio-temporal trajectories of each vehicle in the transit system. In an embodiment of the present invention, the vehicle trajectories may be determined based on the reduced and clustered trajectories of each monitored device 110. In the embodiment, a vehicle trajectory may be determined based on reduced and clustered trajectories of a group of monitored devices 110.

Station-specific clustering of each monitored device 110 may fail to distinguish between trains positioned along a line at or about a station in the transit system. As a result, determinations of the vehicle trajectories with respect to subsequent and preceding stations along the line may be influenced. For example, a particular transit system may include a line with three stations A, B, and C, such as stations 106A, 106B, and 106C, and a train that may travel or journey from stations A to C. That is, the train may depart from station A and subsequently arrive at station B, and may depart from station B and subsequently arrive at station C. A data anomaly may occur when, for example, at station B no passengers having boarded at A are observed at B, but all passengers having boarded at A and B are recognized at C. This type of anomaly can occur, for example, when a WiFi router at station B becomes saturated during the journey, which may result in an erroneous determination that a new train has arrived at B, resulting in additional erroneous determinations to be made with respect to C. Spectral clustering addresses this type of problem as it considers the individual trajectories of each traveler, by way of each monitored device 110, with respect to the journey of each train, and can thus readily interpolate between stations where observations may be missing.

In an embodiment of the present invention, the spatio-temporal trajectories of each vehicle in the transit system may be determined by spectral clustering of the trajectories of each monitored device 110. The spectral clustering may include the definition of a similarity matrix, and may use the eigenvalues of the similarity matrix for dimensionality reduction in the definition of clusters. In the embodiment, a vectorization that may be implemented may embed a journey into $\overline{\mathbb{R}^s} = \mathbb{R}^s \cup \{\infty\}$ by identifying the journey with a vector such as (vector 1):

$$t = (t1, t3, t4, \ldots, ts) \tag{vector 1}$$

where $t_k \in \mathbb{R} + \cup \{\infty\}$ is the mean of timestamps at stations $k = 1 \ldots s$ with $tk = \infty$ if the device is not recorded at k. That is, since for a given journey, only two extremity timestamps at each station are kept, the mean timestamp here corresponds to the midpoint of timestamps of original data. In order to assess the pairwise similarity, we require Definition 4, Definition 5, Definition 6, Definition 7, and Definition 9:

Definition 4 ($l^0$ norm). Let t be a point as in (vector 1), the $l^0$ norm of t is defined as the number of non-infinite entries of t:

Definition 4

$$\|v\|_1 = \sum_{i=1,3,4,\ldots,s} \mathbb{1}_{t_i = \infty}$$

Definition 5 ($l^\infty$ norm). Let t be a point as in (vector 1), the $l^\infty$ norm of t is defined as the maximum absolute value of non-infinite entries:

Definition 5

$$\|t\|_\infty = \begin{cases} \max_{\substack{i=1,3,4,\ldots,s \\ t_i \neq \infty}}, & \text{if } \|v\|_0 \neq 0 \\ \infty, & \text{otherwise} \end{cases}$$

Definition 6 (difference). For $t_1, t_2$, two points as in (vector 1), the difference of $t_1, t_2$ is defined as:

$$t_1 - t_2 = (t_{1,1} - t_{2,1}, t_{1,3} - t_{2,3}, t_{1,4} - t_{2,4}, \ldots, t_{1,s} - t_{2,s});$$

with $\infty - * = \infty$, $* - \infty = \infty$, and $\infty - \infty = \infty$.

Definition 6

Definition 7 (pairwise similarity). For $t_1, t_2$, two points as in (vector 1), the pairwise similarity metrics, (2) and (3), are respectively defined as:

Definition 7

$$sim_{soft}(t_1, t_2) = \|t_1 - t_2\|_0 \exp\left(-\frac{\|t_1 - t_2\|_\infty^2}{2\sigma^2}\right) \tag{2}$$

$$sim_{hard}(t_1, t_2) = \|t_1 - t_2\|_0 \mathbb{1}_{\|t_1 - t_2\|_\infty \leq \tau} \tag{3}$$

where, in (2) and (3), the $l^0$ term quantifies the spatial similarity, i.e., number of stations where both journeys are recorded; the $l^\infty$ term quantifies the temporal similarity, i.e., maximum time difference at stations where both journeys are recorded.

Definition 9 (similarity graph). Given N points $V = \{t_i\}_{i=1}^N$ as in (vector 1), the similarity graph $G = (V, E)$ is such that an edge $e_{i,j} = (t_i, t_j)$ of weight $sim(t_1, t_2)$ exists if $sim(t_1, t_2) > 0$.

Definition 9

Further, let $G = (V, E)$ be an undirected graph with n vertices, and W its weighted adjacency matrix. For a vertex $v_i \in V$, the degree of $v_i$, (4), is defined as:

$$d_i = \Sigma_{j=1}^n w_{i,j} \tag{4}$$

and the degree matrix D, (5), is defined as:

$$D = \begin{pmatrix} d_1 & & & & \\ & d_2 & & & \\ & & \ddots & & \\ & & & d_{n-1} & \\ & & & & d_n \end{pmatrix} \tag{5}$$

Set $A \subset V$ is connected if any two vertices in A can be joined by a path in A. Further, i is defined as being an element of the set A, according to (6):

$$i \in A \text{ to be } \{i | v_i \in A\}. \tag{6}$$

The number of vertices in A may be denoted |A|, and $vol(A) = \Sigma_{i \in A} d_i$. Furthermore, for two sets A, B $\subset$ V, W(A,B), (7), may be defined:

$$W(A,B) = \Sigma_{i \in A, j \in B} w_{i,j} \tag{7}$$

In practice, it is difficult to choose the number of clusters, k, a priori, with respect to the trajectories of each monitored device 110. In an embodiment of the present invention, a cluster of trajectories of devices such as monitored device 110 may correspond to a vehicle trajectory in the transit system. In the embodiment, a number of clusters of the trajectories may correspond to a number of vehicles in the transit system. In the embodiment, an eigengap heuristic may be used to determine, a priori, the number of clusters of the trajectories, k, as a function of the magnitude of the eigenvalues.

In an embodiment of the present invention, Algorithm 1 may be implemented in performing normalized spectral clustering to determine the number of clusters:

---

Algorithm 1: Normalised spectral clustering
   input:      Set of N points $V = \{t_i\}_{i=1}^N$
                 Number of clusters k
               $\tau$ for $sim_{hard}$ or $\sigma$ for $sim_{soft}$ -continued

```
1 Construct graph G with weight matrix W as in Definition 9
2 Remove all isolated points
3 Compute the unnormalized Laplacian L
4 Compute the eigenvalues and eigenvalues of generalized eigenproblem Lu = λDu
5 Keep only the first k eigenvectors u₁, . . . , u_k
6 Let U ∈ ℝ^{N×k} be the matrix containing u₁, . . . , u_k as columns
7 For i = 1, . . . , n, let y_i ∈ ℝ^k be the vector corresponding to the i-th row of U
8 Cluster the points (y_i)_{i=1,...,n} in ℝ^k with the k-means algorithm into k clusters
   Output:    N labels {l_i}_{i=1}^N ⊂ ⟦1, k⟧^N
                                          Algorithm 1
```

Algorithm 2 is extended to make use of the eigengap heuristic:

```
Algorithm 2: Normalised spectral clustering with adaptive number of clusters
    input:      Set of N points V = {t_i}_{i=1}^N
       τ for sim_{hard} or σ for sim_{soft}
1 Construct graph G with weight matrix W as in Definition 9
2 Remove all isolated points
3 Compute the unnormalized Laplacian L
4 Compute the eigenvalues and eigenvalues of generalized eigenproblem Lu = λDu
5 Choose the number of clusters k by eigengap heuristic
6 Keep only the first k eigenvectors u₁, . . . , u_k
7 Let U ∈ ℝ^{N×k} be the matrix containing u₁, . . . , u_k as columns
8 For i = 1, . . . , n, let y_i ∈ ℝ^k be the vector corresponding to the i-th row of U
9 Cluster the points (y_i)_{i=1,...,n} in ℝ^k with the k-means algorithm into k clusters
   Output:    N labels {l_i}_{i=1}^N ⊂ ⟦1, k⟧^N
                                          Algorithm 2
```

At step S210, trajectory determination module 124 removes outliers from the determined vehicle trajectories. In an embodiment of the present invention, the outliers may include erroneously determined or identified journeys or trajectories of individual devices such as monitored device 110. The erroneously determined journeys, if not removed, may skew or otherwise introduce inaccuracies into the determined vehicle trajectories. The outliers may include, for example, those produced as a result of erroneously determined or identified journeys of individual devices, such as at steps S204, S206, or S208. Such an outlier may be produced as a result of, for example, an instance where a device owner, such as of monitored device 110D, fails to board a train in the transit system, and monitored device 110D does not send further probe requests while present on the platform after failure of the owner to board, as depicted in FIG. 1B.

In an embodiment of the present invention, the outliers may be detected and subsequently removed with respect to the determined spatio-temporal trajectories of each monitored device 110 in the transit system. The outliers may be removed after the spectral clustering is performed, as in step S208. In the embodiment, the outliers may be detected and removed by implementing a k-nearest neighbors algorithm. The k-nearest neighbors algorithm may be implemented to detect or identify misclassified, or mis-clustered, device trajectories with respect to corresponding vehicle trajectories. The outliers may be removed, for example, by implementing Algorithm 3:

```
Algorithm 3: Type 1 outlier detection using k-NN
    input:      N records R = {r_i}_{i=1}^N = {m_i, v_i, t_i, c_i}_{i=1}^N with m_i MAC address, v_i venue or
       station ID, t_i timestamp, and c_i cluster label;
1 for every venue ID v in R, do
{
2 R_v ← {r_i ∈ R | v_i = v}
3 use k-NN to assign a new cluster label c_v^{neighbour} to ever record r_v
}
4 R' ← {r_i ∈ R | c_i = c_i^{neighbor}}
output:     R'
                                          Algorithm 3
```

Outliers produced as a result of intrinsic wireless computer networking data characteristics may be caused by unpredictable transmission of probe requests by each individual monitored device 110. In an embodiment of the present invention, the outliers produced by the intrinsic wireless computer networking data characteristics may be removed. Such outliers may be caused, for example, in instances where the last record at the origin station or the first record at the destination station of a device such as monitored device 110 does not correspond with a vehicle's determined trajectory in the transit system. Such outliers may be dropped rather than integrated into any determined trajectory or journey. In the embodiment, such outliers may be detected and removed by determining a mean absolute deviation distance metric for comparison with each outlier with respect to a clustered group of individual device trajectories. The metric may represent a predetermined threshold for detecting the outliers. The metric may be determined based on a median absolute deviation and a consistent estimator of standard deviation of such outliers.

For example, the outliers may be detected and removed in accordance with Definition 10 and Definition 11:

Definition 10 (median absolute deviation, MAD). Let $x_1, x_2, \ldots, x_n \in \mathbb{R}$, the median absolute deviation is defined as:

$$\mathrm{MAD} = \mathrm{median}_{i=1}^n (x_i - \mathrm{median}_{j=1}^n x_j).$$

Definition 10

Definition 11 (consistent estimator of standard deviation). Let $x_1, x_2, \ldots, x_n \sim N(\mu, \sigma)$ be independent and identically distributed, then:

Definition 11

$$\hat{\sigma} = \frac{1}{\Phi^{-1}(3/4)} MAD \approx 1.4826 MAD$$

Advantageously, using Definition 11 as an estimator of standard deviation may be robust in detecting such outliers, as such outliers may occur relatively rarely. In the embodiment, such outliers may be removed by implementing Algorithm 4:

---

Algorithm 4: Type 2 outlier detection using Median Absolute Deviation
input:    N records $R = \{r_i\}_{i=1}^N = \{m_i, v_i, t_i, c_i\}_{i=1}^N$ with $m_i$ MAC address, $v_i$ venue or station ID, $t_i$ timestamp, and $c_i$ cluster label;
    threshold $\tau$
1 for every venue ID v in R, do
{
2 $R_v \leftarrow \{r_i \in R | v_i = v\}$
  3 for every label c do
  {
    4 $R_{v,c} \leftarrow \{r_i \in R_v | c_i = c\}$
    5 MAD $\leftarrow$ MAD($t_{v,c}$)
    6 $\hat{\sigma}$ = 1.4826MAD
    7 for every label $r_{v,c}$ do
    {
      8 if $\{|t_{v,c} - \mathrm{MAD}| \geq \tau\hat{\sigma}$ then
        9 remove $r_{v,c}$ }
}}}
output:    R'
        Algorithm 4

--- lope of each cluster may be used to connect the arrival and departure times at stations with the wireless computer networking data. The envelope may not necessarily be convex. In the embodiment, the dwell time of a given vehicle may be determined based on a time difference between the minimum and maximum timestamps in the cluster, with respect to a corresponding station. In the embodiment, the headway of a given vehicle may be determined with respect to a given station based on, for example, a time difference between the maximum timestamp in a departing cluster and the earliest timestamp in a subsequently arriving cluster.

In an embodiment of the present invention, one or more of the system parameters of the transit system may be adjusted based on a determined vehicle trajectory or vehicle schedule. As an example, vehicle headways may be reduced to adjust vehicle schedules and increase throughput through the transit system. As another example, a dwell time of a vehicle at a station platform may be increased to adjust vehicle schedules and reduce a crowd density level at the station platform. As another example, a station dwell time of a vehicle positioned at a station may be minimized based on a determined vehicle trajectory of a vehicle having departed from a preceding station. Generally, any combination of the system parameters may be adjusted based on the determined vehicle trajectory or vehicle schedule.

At step S212, parameter determination module 126 determines the system parameters of the transit system. The clusters that result from the spectral clustering at step S208 after outlier removal (i.e., at step S210) represent the spatio-temporal trajectories of each vehicle in the transit system. For example, a trajectory of a vehicle traveling from station 106A to station 106C may be deduced based on the clustered trajectories of monitored device 110B and 110E from station 106A to station 106C, as depicted in FIG. 1B.

Figure 2B:
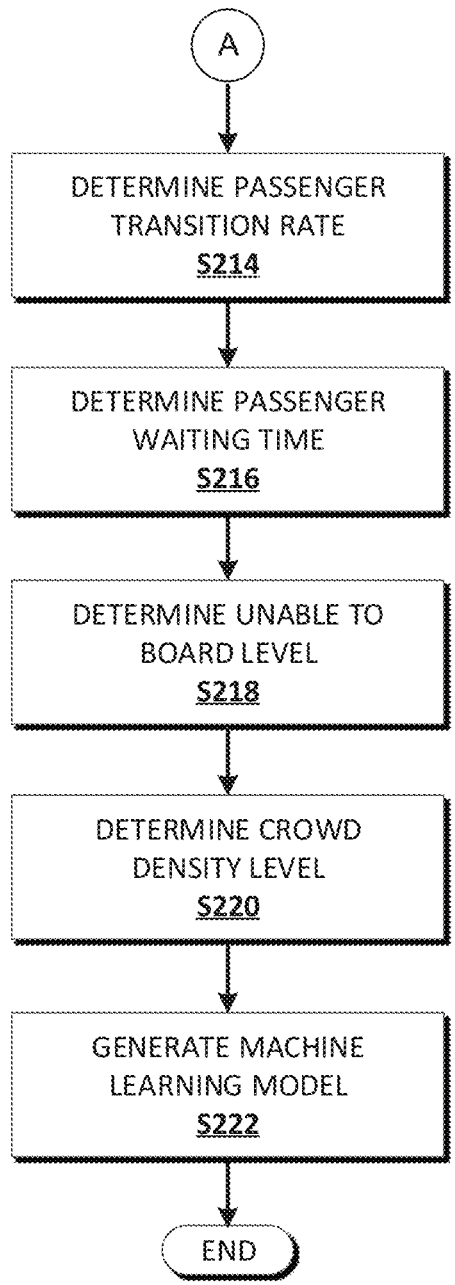

In an embodiment of the present invention, vehicle schedules may be determined based on the trajectories of each vehicle in the transit system. In the embodiment, the vehicle schedules may be defined by arrival and departure times of each vehicle with respect to each station in the transit system. In the embodiment, for each clustered trajectory representing a corresponding vehicle trajectory, the arrival and departure times may be determined based on the minimum and maximum timestamps in each respective cluster with respect to stations by which each respective trajectory may pass. The minimum timestamp may correspond to an earliest timestamp in the cluster, and the maximum timestamp may correspond to a latest timestamp in the cluster. To estimate trains when intermediate stations have no wireless computer networking data or WiFi observations, the enve- FIG. 2B is a flowchart depicting operational steps of an aspect of service level monitor system 100, in accordance with an embodiment of the present invention.

At step S214, parameter determination module 126 determines a transition rate of passengers with respect to a given station platform in the transit system. The transition rate may be specified, for example, in terms of a number of incoming and outgoing passengers to and from the given station platform during a predefined time period or interval. In an embodiment of the present invention, the transition rate may be determined based on the determined trajectories of each monitored device 110 in the transit system, as described with reference to step S204. In the embodiment, the transition rate may be determined based on the determined vehicle trajectories of each vehicle in the transit system, as described with reference to step S208. Movements of each monitored device 110 may represent, for example, the incoming and outgoing passengers to and from the given station platform during the predefined time period or interval. The transition rate may be determined, for example, as a function of the trajectories of each monitored device 110 and the trajectories of each vehicle with respect to the station platform during a predefined time period. As an example, a transition rate of passengers with respect to station 106B may be determined for a predefined time period based on the trajectories of monitored devices 110A, 110B, and 110E from station 106A to 106B, as depicted in FIG. 1B. Accordingly, the transition rate of passengers with respect to station 106B may be determined to be 3 passengers per unit time.

At step S216, parameter determination module 126 determines passenger waiting times with respect to a given station platform in the transit system. In an embodiment of the present invention, the passenger waiting times may be determined, for example, based on periods of time during which devices such as monitored device 110 may be present at the station platform. In the embodiment, a distribution of waiting times of passengers at the station platform may be determined based on the determined trajectories of each monitored device 110, as such may be located or positioned at and about the station platform for a predefined time period. In the embodiment, the waiting time distribution of each passenger at the station platform may be determined based on the time series data sets including the sequences of records corresponding to each monitored device 110. Passengers waiting to boarding at a given station may be distinguished from in-transit passengers based on historical transitions of each monitored device 110 with respect to the station. That is, the boarding passengers may be identified based on corresponding time series data sets including sequences of records received from each monitored device 110 indicating a presence of each monitored device 110 at the station platform before, during, and after arrival and departure of a vehicle at the station platform. The historical transitions may be determined based on the respective MAC addresses of each monitored device 110. In the embodiment, the waiting time of each monitored device 110 at the station platform may be determined based on the first and last signal timestamp of each respective device recorded at the station. In the embodiment, waiting times falling below a predetermined threshold may be ignored or removed. Such waiting times may generally be considered to be anomalous. As an example, waiting times of passengers may be determined for a predefined time period with respect to station 106A based on the trajectories of monitored devices 110A, 110B, and 110E within an area defined by station 106A, as depicted in FIG. 1B, where the area may be defined, for example, by a range of access point 104A.

At step S218, parameter determination module 126 determines an unable-to-board level with respect to a given station platform in the transit system. In an embodiment of the present invention, the unable-to-board level may be determined based on the determined trajectories of each monitored device 110, as such devices may be located at and about the station platform during a predefined time period. In the embodiment, the unable-to-board level may be determined based on a probability distribution of determined passenger waiting times at and about the station platform during a predefined time period. In the embodiment, the unable-to-board level may be determined based on headways of consecutively arriving and departing vehicles at and from the station. In the embodiment, the unable-to-board level may further be determined based on dwell times of vehicles at stations adjacent to the given station platform. In the embodiment, the unable-to-board level may further be determined based on a determined crowd density level at the station platform, as described with reference to step S220. In the embodiment, the unable-to-board level may further be determined based on ground survey data. The ground survey data may include, for example, CCTV camera footage, fare gate or turnstile sensor data, and the like.

At step S220, parameter determination module 126 determines a crowd density level with respect to a given station platform in the transit system. In an embodiment of the present invention, the crowd density level may be determined with respect to the station platform based on the determined passenger transition rate, the determined passenger waiting time, and the determined unable-to-board level during a predefined time period. As an example, a crowd density level may be determined for a predefined time period with respect to station 106C, based on the trajectories of monitored devices 110B, 110C, and 110E, as depicted in FIG. 1B. The crowd density level may vary based on passengers entering the transit system at station 106C, as depicted by the trajectory of monitored device 110C in FIG. 1B. The crowd density level may be measured, for example, in terms of a number of passengers or devices present at station 106C.

At step S222, parameter determination module 126 generates a machine learning model. In an embodiment of the present invention, the machine learning model may include, for example, a logistic regression classifier such as a multinomial logistic regression classifier. The machine learning model may be implemented in augmenting the determinations of the system parameters of the transit system, as previously described.

In an embodiment of the present invention, the machine learning model may be trained by way of, for example, a greedy forward feature selection method. Greedy forward feature selection methods may be used to identify and select effective features for use in training the machine learning model. In the embodiment, the features used in training the machine learning model may include, for example, real-time and historical system parameters of the transit system, including the vehicle schedules, passenger transition rates, station dwell times, vehicle headways, passenger waiting times, unable-to-board levels, and crowd density levels in vehicles and on station platforms or waiting areas of the transit system. In the embodiment, the system parameters used in training the machine learning model be determined in real-time or historically. In the embodiment, the features used in training may further include the determined trajectories of each monitored device 110, as previously described. In the embodiment, the features used in training may further include the ground survey data, as previously described. In the embodiment, the effects of the historical features on the various system parameters of the transit system may be relatively classified or categorized as positive or negative events for use in training the machine learning model with respect to respective levels of impact of the features on various system parameters. For example, historical conditions of the transit system including high crowd density levels and high unable-to-board levels at a station platform may be classified as a "negative" event that may affect system throughput by inhibiting passenger boarding. Generally, the features implemented in training the machine learning model may be chosen as a matter of design.

In an embodiment of the present invention, the trained machine learning model may be implemented in determining a scale factor for adjusting a system parameter of the transit system. In the embodiment, the scale factor may be applied in adjusting determined vehicle schedules, passenger transition rates, station dwell times, vehicle headways, passenger waiting times, unable-to-board levels, and crowd density levels. The scale factor may be determined to account for unmeasured and unmeasurable events, variables, factors, or conditions that may be subject to chance or have various likelihoods of occurring with respect to the transit system. That is, the scale factor parameter may be implemented to more closely approximate the system parameters of the transit system with respect to actual conditions in the system that may not be accounted for by any of the aforementioned system parameters. Generally, the system parameters may vary or fluctuate continuously at various rates in accordance with different times of any given day. In the embodiment, the scale factor may be determined as a continuous time series.

For example, a scale factor may be implemented to adjust a determined crowd density level at a particular station platform based on historical data received from fare gate sensors positioned about the station platform. The historical data may include historical fare gate sensor data and corresponding crowd density level data, as received on weekdays during rush hour at the station platform.

Entry fare gate sensors are a reliable and accurate source of data. In an embodiment of the present invention, the scale factor may be determined as a ratio of the count of passengers Y from the fare gate sensors during a predetermined time period, t, to the count of passengers X as derived from the wireless computer networking data during the predetermined time period. For a given station, s, day of week, i, predefined time period, t, and number of samples, n, we define a scale factor, $\theta_{s,t}$, according to Equation 1:

$$\theta_{s,t} = \Sigma_1^n Y_{s,t} / \Sigma_1^n X_{s,t} \quad \text{(Equation 1)}$$

In an embodiment of the present invention, the scale factor may be determined based on historical data samples of the wireless computer networking data, and fare card data sources for different stations with respect to day categories and time period windows. The fare card data may be received, for example, by fare card sensors positioned about the station, through which passengers may enter and exit the station. In the embodiment, the historical data samples of the wireless computer networking data and the fare card data may be implemented in training the classification model.

In an embodiment of the present invention, a scale factor may be determined for adjusting a determined crowd density level at the given station platform with respect to the predefined time period. The count of passengers at a station platform waiting to board a train at any given point in time gives a measure of platform crowdedness, or crowd density level. In the embodiment, the scale factor for adjusting the determined crowd density level may be determined based on a distribution of passenger waiting times at the station platform.

In an embodiment of the present invention, a scale factor may be determined for adjusting a determined unable-to-board level at the given station platform with respect to a predefined time period. The unable-to-board level may be determined based on detected occurrences of passengers unable to board a vehicle from the station platform, as such may be caused, for example, by excessive crowd density levels at the station platform or in the vehicle during boarding time. In the embodiment, the passengers unable to board the train may include, for example, passengers present at a given station both before and after a train arrives at and subsequently departs from the station. In the embodiment, an unable-to-board level may represent, for example, a percentage of passengers at a station platform in the transit system that may be unable to board a vehicle with respect to a predefined time period. In the embodiment, a scale factor may be determined and implemented for adjusting the determined percentage of passengers unable to board.

Figure 3:
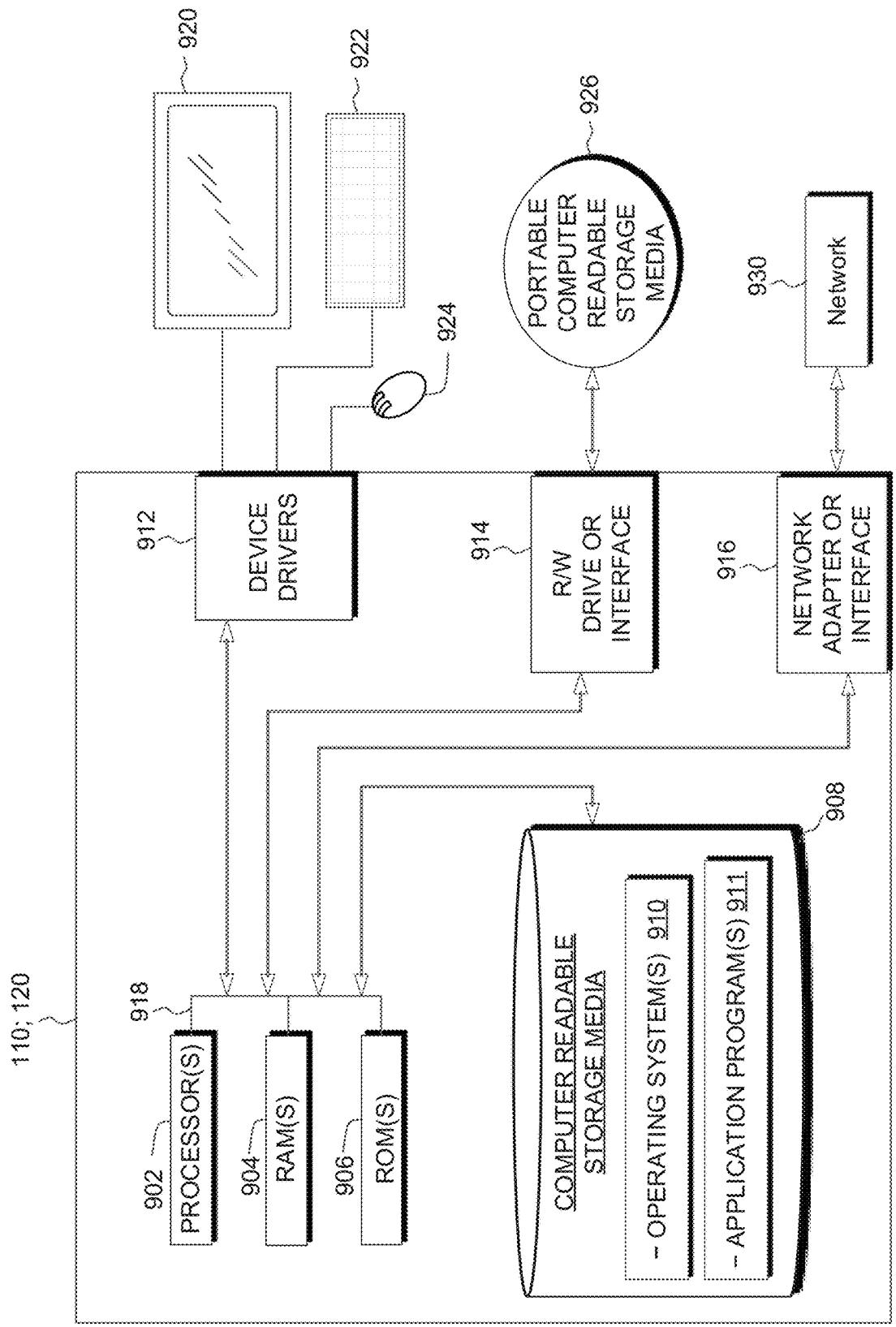
FIG. 3 is a block diagram depicting a monitored device and/or a service level monitor device, in accordance with an embodiment of the present invention.

FIG. 3 is a block diagram depicting monitored device 110 and/or service level monitor device 120, in accordance with an embodiment of the present invention. As depicted in FIG. 3, monitored device 110 and/or service level monitor device 120 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, such as service level monitor program 121 residing on service level monitor device 120, as depicted in FIG. 1, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Monitored device 110 and/or service level monitor device 120 may also include a R/W drive or interface 914 to read from and write to one or more portable computer readable storage media 926. Application programs 911 on monitored device 110 and/or service level monitor device 120 may be stored on one or more of the portable computer readable storage media 926, read via the respective R/W drive or interface 914 and loaded into the respective computer readable storage media 908. Monitored device 110 and/or service level monitor device 120 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the server 220 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. Monitored device 110 and/or service level monitor device 120 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may include hardware and software (stored on computer readable storage media 908 and/or ROM 906).

Service level monitor device 120 can be a standalone network server, or represent functionality integrated into one or more network systems. In general, monitored device 110 and/or service level monitor device 120 can be a laptop computer, desktop computer, specialized computer server, or any other computer system known in the art. In certain embodiments, service level monitor device 120 represents computer systems utilizing clustered computers and components to act as a single pool of seamless resources when accessed through a network, such as a LAN, WAN, or a combination of the two. This implementation may be preferred for data centers and for cloud computing applications. In general, monitored device 110 and/or service level monitor device 120 can be any programmable electronic device, or can be any combination of such devices.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
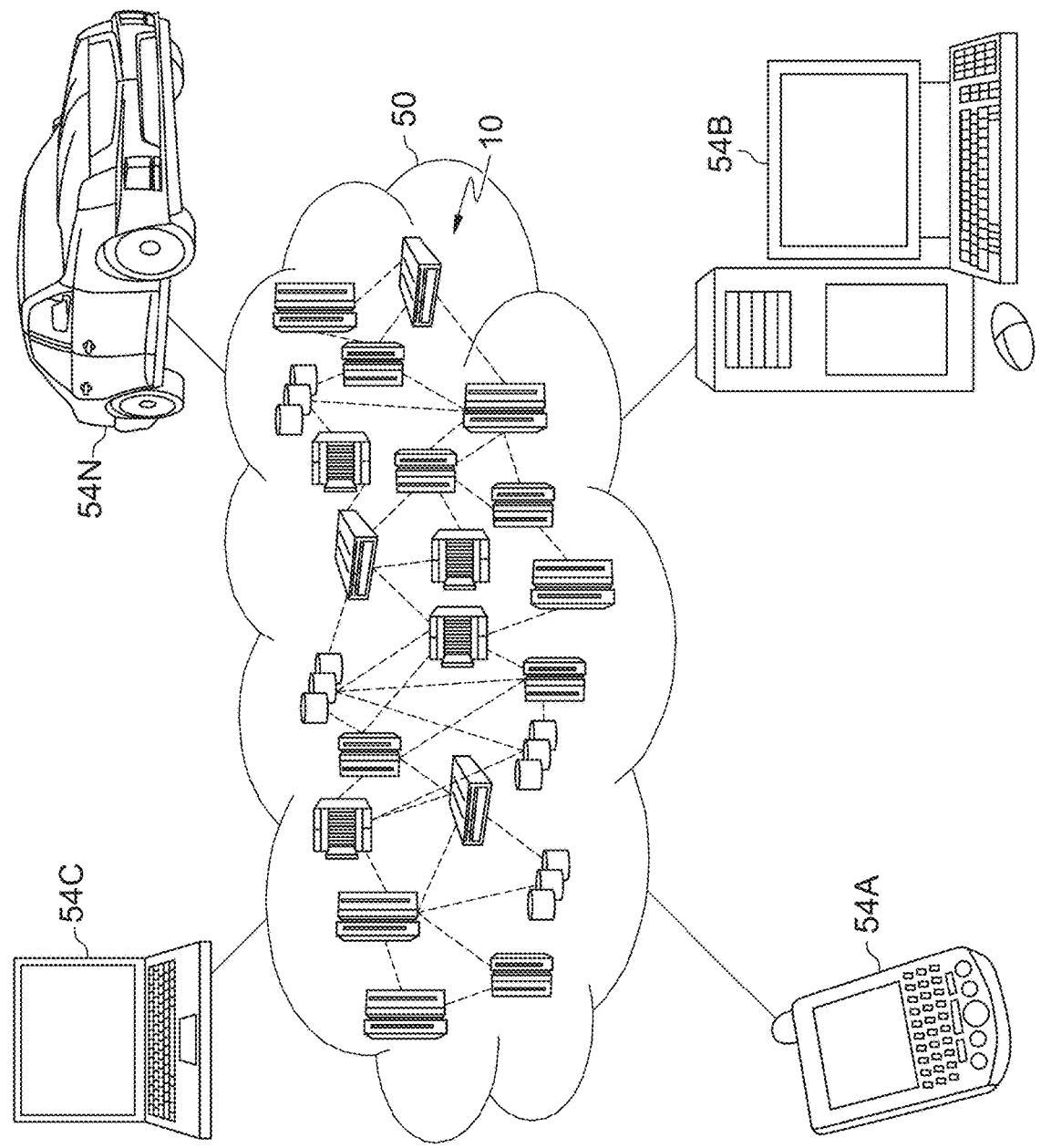
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
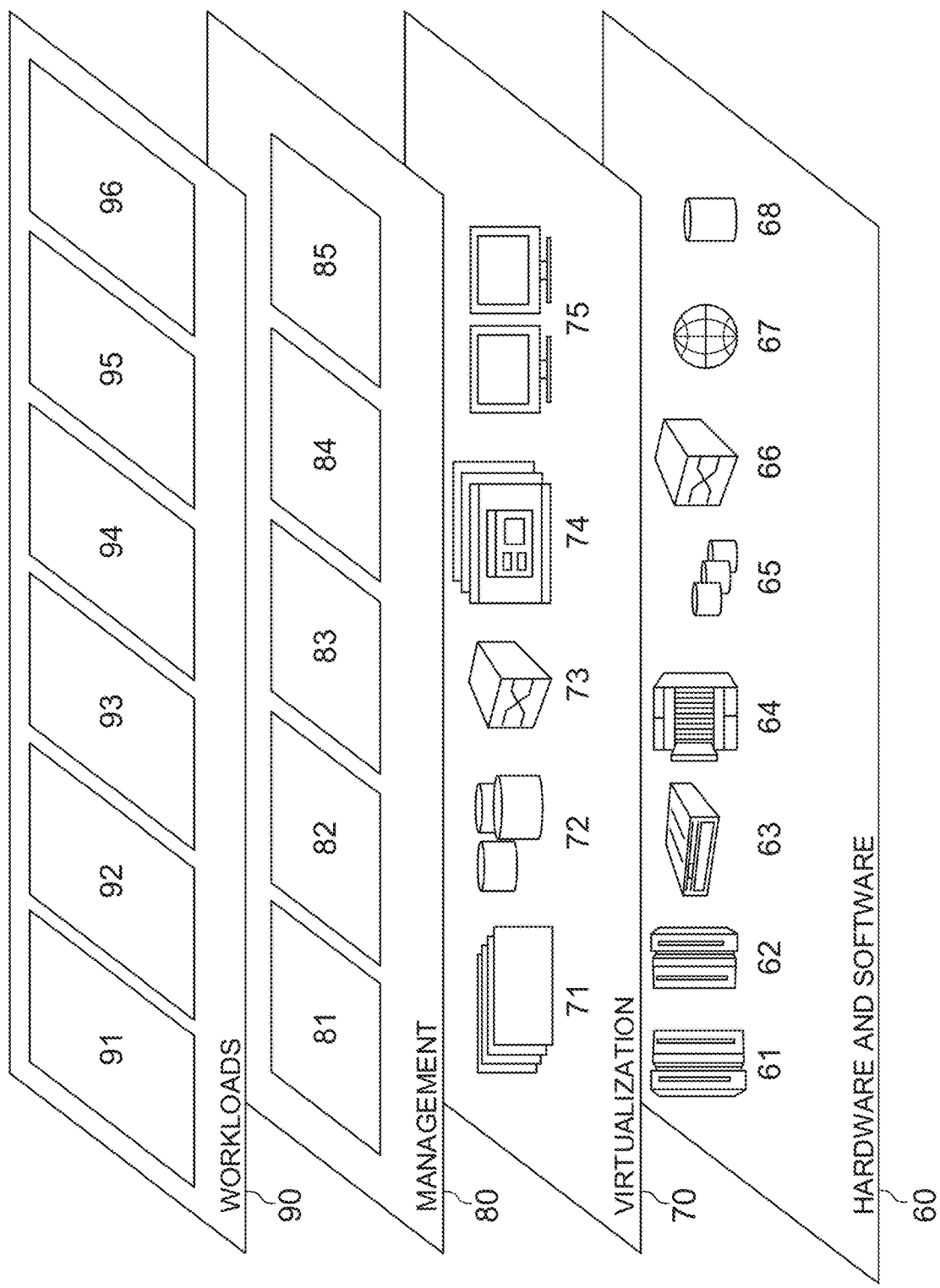
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service level monitoring 96. Service level monitoring 96 may include functionality enabling the cloud computing environment to be used in service level monitoring of a transit system, in accordance with embodiments of the present invention.

While the invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the present invention has been disclosed by way of example for purposes of illustration, and not limitation.

What is claimed is:

1. A computer-implemented method for service level monitoring and management of a mass transit system, the method comprising:
    receiving time series data sets from wireless access points of a wireless computer network, wherein the access points are co-located with stations of the transit system, and wherein each time series data set corresponds to a mobile device in the transit system;
    determining spatio-temporal trajectories of each mobile device in the transit system based on the time series data sets corresponding to each mobile device, wherein each time series data set comprises an identifier associated with a device, a device location, and a timestamp indicating a time at which the time series data sets corresponding to each mobile device were received, and wherein the determined spatio-temporal trajectories of each mobile device in the transit system;
    identifying trains traveling in the transit system by clustering the determined spatio-temporal trajectories of each mobile device in the transit system, wherein clustering the determined spatio-temporal trajectories of each mobile device in the transit system comprises:
        identifying a last record at an origin station in the time series data set for each device;
        identifying a first record at a destination station in the time series data set for each device;
        removing the last record at the origin station from the time series data set for each device;
        removing the first record at a destination station from the time series data set for each device;
    determining spatio-temporal trajectories of each identified train in the transit system based on the clustered spatio-temporal trajectory of the group of individual devices;
    adjusting system parameters of the transit system based on the determined spatio-temporal trajectories of each identified train in the transit system, wherein adjusting the system parameters of the transit system comprises:
        adjusting train schedules to reduce vehicle headways such that train throughput through the transit system is increased;
    detecting an outlier with respect to the clustered spatio-temporal trajectories of each mobile device in the transit system by implementing a k-nearest neighbors algorithm, wherein the outlier comprises a determined spatio-temporal trajectory of at least one mobile device in the transit system;
    removing the outlier from the clustered spatio-temporal trajectories; and
    determining a median absolute deviation and a consistent estimator of standard deviation of the outlier with respect to the clustered spatio-temporal trajectories.

2. The method of claim 1, wherein determining the spatio-temporal trajectory of the vehicle in the transit system comprises:
    clustering determined spatio-temporal trajectories of at least two groups of individual devices;
    defining a similarity matrix based on the clustered spatio-temporal trajectories of the at least two groups of individual devices; and
    determining eigenvalues of the similarity matrix.

3. The method of claim 1, further comprising:
    determining a number of vehicles in the transit system based on the clustered spatio-temporal trajectories of the at least two groups of individual devices.

4. The method of claim 1, wherein the system parameters include train schedules, passenger transition rates, station dwell times, train headways, passenger waiting times, unable-to-board levels, crowd density levels in trains, crowd density levels on station platforms, and crowd density levels on waiting areas of the transit system.

5. The method of claim 1, wherein the spatio-temporal trajectories of each mobile device in the transit system are determined with respect to an origin station and a destination station of the transit system such that each trajectory extends between the origin station and the destination station across any number of intermediate stations of the transit system.

6. A computer system for service level monitoring and management of a mass transit system, the computer system comprising:
    one or more computer processors, one or more computer-readable storage media, and program instructions stored on one or more of the computer-readable storage media for execution by at least one of the one or more computer processors, the program instructions, when executed by the at least one of the one or more computer processors, causing the computer system to perform a method comprising:
    receiving time series data sets from wireless access points of a wireless computer network, wherein the access points are co-located with stations of the transit system, and wherein each time series data set corresponds to a mobile device in the transit system;
    determining spatio-temporal trajectories of each mobile device in the transit system based on the time series data sets corresponding to each mobile device, wherein each time series data set comprises an identifier associated with a device, a device location, and a timestamp indicating a time at which the time series data sets corresponding to each mobile device were received, and wherein the determined spatio-temporal trajectories of each mobile device in the transit system;
    identifying trains traveling in the transit system by clustering the determined spatio-temporal trajectories of each mobile device in the transit system, wherein clustering the determined spatio-temporal trajectories of each mobile device in the transit system comprises:
        identifying a last record at an origin station in the time series data set for each device;
        identifying a first record at a destination station in the time series data set for each device;
        removing the last record at the origin station from the time series data set for each device;

removing the first record at a destination station from the time series data set for each device;

determining spatio-temporal trajectories of each identified train in the transit system based on the clustered spatio-temporal trajectory of the group of individual devices;

adjusting system parameters of the transit system based on the determined spatio-temporal trajectories of each identified train in the transit system, wherein adjusting the system parameters of the transit system comprises:
adjusting train schedules by increasing dwell time of at least one identified train at the station platform such that the determined crowd density level at the station platform is reduced detecting an outlier with respect to the clustered spatio-temporal trajectories of each mobile device in the transit system by implementing a k-nearest neighbors algorithm, wherein the outlier comprises a determined spatio-temporal trajectory of at least one mobile device in the transit system;

removing the outlier from the clustered spatio-temporal trajectories; and determining a median absolute deviation and a consistent estimator of standard deviation of the outlier with respect to the clustered spatio-temporal trajectories.

7. The method of claim 6, wherein determining the spatio-temporal trajectory of the vehicle in the transit system comprises:
clustering determined spatio-temporal trajectories of at least two groups of individual devices;
defining a similarity matrix based on the clustered spatio-temporal trajectories of the at least two groups of individual devices; and
determining eigenvalues of the similarity matrix.

8. The method of claim 6, further comprising:
determining a number of vehicles in the transit system based on the clustered spatio-temporal trajectories of the at least two groups of individual devices.

9. The method of claim 6, wherein the system parameters include train schedules, passenger transition rates, station dwell times, train headways, passenger waiting times, unable-to-board levels, crowd density levels in trains, crowd density levels on station platforms, and crowd density levels on waiting areas of the transit system.

10. The method of claim 6, wherein the spatio-temporal trajectories of each mobile device in the transit system are determined with respect to an origin station and a destination station of the transit system such that each trajectory extends between the origin station and the destination station across any number of intermediate stations of the transit system.

11. A computer program product for service level monitoring and management of a mass transit system, the computer program product comprising:
one or more computer-readable storage devices and program instructions stored on at least one of the one or more computer-readable storage devices for execution by at least one or more computer processors of a computer system, the program instructions, when executed by the at least one of the one or more computer processors, causing the computer system to perform a method comprising:
receiving time series data sets from wireless access points of a wireless computer network, wherein the access points are co-located with stations of the transit system, and wherein each time series data set corresponds to a mobile device in the transit system;
determining spatio-temporal trajectories of each mobile device in the transit system based on the time series data sets corresponding to each mobile device, wherein each time series data set comprises an identifier associated with a device, a device location, and a timestamp indicating a time at which the time series data sets corresponding to each mobile device were received, and wherein the determined spatio-temporal trajectories of each mobile device in the transit system;

identifying trains traveling in the transit system by clustering the determined spatio-temporal trajectories of each mobile device in the transit system, wherein clustering the determined spatio-temporal trajectories of each mobile device in the transit system comprises:
identifying a last record at an origin station in the time series data set for each device;
identifying a first record at a destination station in the time series data set for each device;
removing the last record at the origin station from the time series data set for each device;
removing the first record at a destination station from the time series data set for each device;

determining spatio-temporal trajectories of each identified train in the transit system based on the clustered spatio-temporal trajectory of the group of individual devices;

adjusting system parameters of the transit system based on the determined spatio-temporal trajectories of each identified train in the transit system, wherein adjusting the system parameters of the transit system comprises:
adjusting train schedules by decreasing dwell time of at least one identified train at the station platform based on a determined vehicle trajectory of a vehicle having departed from a preceding station;

detecting an outlier with respect to the clustered spatio-temporal trajectories of each mobile device in the transit system by implementing a k-nearest neighbors algorithm, wherein the outlier comprises a determined spatio-temporal trajectory of at least one mobile device in the transit system;

removing the outlier from the clustered spatio-temporal trajectories; and determining a median absolute deviation and a consistent estimator of standard deviation of the outlier with respect to the clustered spatio-temporal trajectories.

12. The method of claim 11, wherein determining the spatio-temporal trajectory of the vehicle in the transit system comprises:
clustering determined spatio-temporal trajectories of at least two groups of individual devices;
defining a similarity matrix based on the clustered spatio-temporal trajectories of the at least two groups of individual devices; and
determining eigenvalues of the similarity matrix.

13. The method of claim 11, further comprising:
determining a number of vehicles in the transit system based on the clustered spatio-temporal trajectories of the at least two groups of individual devices.

14. The method of claim 11, wherein the system parameters include train schedules, passenger transition rates, station dwell times, train headways, passenger waiting times, unable-to-board levels, crowd density levels in trains, crowd density levels on station platforms, and crowd density levels on waiting areas of the transit system.

15. The method of claim 11, wherein the spatio-temporal trajectories of each mobile device in the transit system are determined with respect to an origin station and a destination station of the transit system such that each trajectory extends between the origin station and the destination station across any number of intermediate stations of the transit system.

* * * * *